(12) United States Patent
Luick

(10) Patent No.: US 6,823,430 B2
(45) Date of Patent: Nov. 23, 2004

(54) DIRECTORYLESS L0 CACHE FOR STALL REDUCTION

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 10/268,846

(22) Filed: Oct. 10, 2002

(65) Prior Publication Data

US 2004/0073753 A1 Apr. 15, 2004

(51) Int. Cl.[7] .............................................. G06F 12/00
(52) U.S. Cl. ...................... 711/141; 411/122; 411/128; 411/168; 411/169
(58) Field of Search ................................ 711/122, 168, 711/169, 128, 141, 150, 151, 158

(56) References Cited

U.S. PATENT DOCUMENTS

| | | | | |
|---|---|---|---|---|
| 4,774,654 A | * | 9/1988 | Pomerene et al. | 711/122 |
| 5,649,154 A | * | 7/1997 | Kumar et al. | 711/122 |
| 5,826,052 A | * | 10/1998 | Stiles et al. | 712/205 |
| 6,078,992 A | * | 6/2000 | Hum | 711/122 |
| 6,081,872 A | * | 6/2000 | Matick et al. | 711/122 |
| 6,138,208 A | * | 10/2000 | Dhong et al. | 711/122 |
| 6,282,614 B1 | * | 8/2001 | Musoll | 711/122 |
| 6,321,297 B1 | * | 11/2001 | Shamanna et al. | 711/122 |
| 6,397,296 B1 | * | 5/2002 | Werner | 711/122 |
| 6,496,903 B1 | * | 12/2002 | Terunuma et al. | 711/128 |
| 2002/0046325 A1 | * | 4/2002 | Cai et al. | 711/122 |

* cited by examiner

Primary Examiner—Hong Kim
(74) Attorney, Agent, or Firm—Arnall, Golden & Gregory LLP

(57) ABSTRACT

A memory system for a computational circuit having a pipeline includes at least one functional unit and an address generator that generates a memory address. A coherent cache memory is responsive to the address generator and is addressed by the memory address. The cache memory is capable of generating a cache memory output. A non-coherent directory-less associative memory is responsive to the address generator and is addressable by the memory address. The associative memory receives input data from the cache memory. The associative memory is capable of generating an associative memory output that is delivered to the functional unit. A comparison circuit compares the associative memory output to the cache memory output and asserts a miscompare signal when the associative memory output is not equal to the cache memory output.

6 Claims, 3 Drawing Sheets

DIRECTORYLESS L0 CACHE FOR STALL REDUCTION

BACKGROUND OF THE INVENTION

1. Field of the Invention

The present invention relates to computer systems and, more specifically, to a cache system in a central processing unit of a computer.

2. Description of the Prior Art

Many modern computing systems use a processor having a pipelined architecture to increase instruction throughput. In theory, pipelined processors can execute one instruction per machine cycle when a well-ordered, sequential instruction stream is being executed. This is accomplished even though the instruction itself may implicate or require a number of separate microinstructions to be executed. Pipelined processors operate by breaking up the execution of an instruction into several stages that each require one machine cycle to complete. Latency is reduced in pipelined processors by initiating the processing of a second instruction before the actual execution of the first instruction is completed. In fact, multiple instructions can be in various stages of processing at any given time. Thus, the overall instruction execution latency of the system (which, in general, can be thought of as the delay between the time a sequence of instructions is initiated, and the time it is finished executing) can be significantly reduced.

In some modern computer systems, integer and commercial instruction streams have many loads whose targets have an immediate usage in the next instruction. With higher frequency microprocessors, pipeline depth has increased such that a level one data cache (L1 Dcache) load access can be many cycles, during which time any following dependent instructions must stall. An additional small data cache, called an L0 or level zero cache, has been proposed to mitigate the longer L1 Dcache access where the L0 is typically a one cycle total lead access time cache of small size, 1–8 KB. However, in high-frequency pipelined designs, L0 caches have been fraught with problems, including: high miss rates (30–50%) from their small size and direct map nature (one-way associative), significant additional complexity of another full data cache level, high power usage due to their constant utilization, and long line fill times creating line reference trailing edge stalls. The combination of these factors, combined with extremely high-frequency deep pipelines, has led to the general abandonment of L0 caches.

Therefore, there is a need for a small cache with a short lead access time that has a low miss rate, low power usage and a short fill line time.

SUMMARY OF THE INVENTION

The disadvantages of the prior art are overcome by the present invention which, in one aspect, is a memory system for a computational circuit having a pipeline including at least one functional unit. An address generator generates a memory address. A coherent cache memory is responsive to the address generator and is addressed by the memory address. A cache directory is associated with the cache memory. The cache memory is capable of generating a cache memory output. A non-coherent directory-less associative memory is responsive to the address generator and is addressable by the memory address. The associative memory receives input data from the cache memory. The associative memory is capable of generating an associative memory output that is delivered to the functional unit. A comparison circuit compares the associative memory output to the cache memory output and asserts a miscompare signal when the associative memory output is not equal to the cache memory output.

In another aspect, the invention is a method of providing data to a functional unit of a pipeline. A coherent cache memory is addressed with a memory address, thereby generating a cache memory output. A non-coherent directory-less associative memory is addressed with the memory address, thereby generating an associative memory output. The associative memory output is delivered to the functional unit. The cache memory output is compared to the associative memory output. When the cache memory output is not identical to the associative memory output, the functional unit is disabled.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
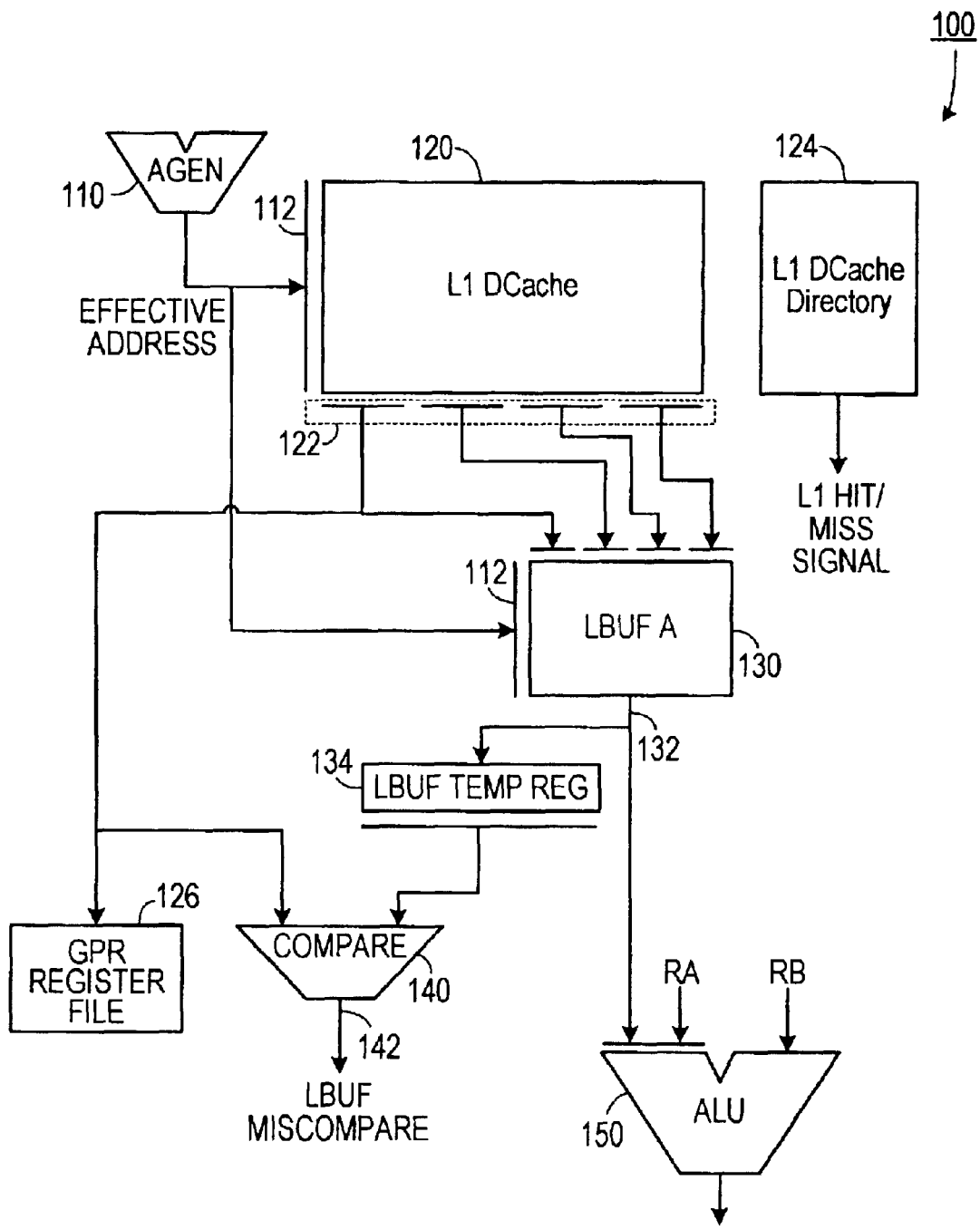
FIG. 1 is a block diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of the invention is a memory system 100 for a computational circuit having a pipeline including at least one functional unit 150, such as an arithmetic-logic unit (ALU). Typically, an address generator 110 generates memory addresses 112 used by the computational circuit to access data stored in memory. The computational circuit includes a coherent cache memory 120 (also referred to as "L1 Dcache") that is addressable by the memory address 112. The coherent cache memory 120 is used to store recently accessed read data that is likely to be used again. (Store data is not kept in the LBUF.) A cache directory 124 is associated with the cache memory and provides information about cache hits or misses. The cache memory 120 generates a cache memory output 122 that generally has a high probability of being needed by the functional unit. Typically, the coherent cache memory 120 takes several cycles to access. At the completion of a cache memory 120 access, a hit is recorded in a GPR register file 126.

A non-coherent directory-less associative memory 130 (also referred to as a "load buffer" or "LBUF") is also addressable by the memory address 112. Because of its non-coherent directory-less nature, and because of its relatively small size and close proximity to the execution unit, the associative memory 130 may be accessed in a single cycle. The associative memory 130 receives input data from the cache memory 120 and is capable of generating an associative memory output 132 that is delivered to the functional unit 150.

A comparison circuit 140 compares the associative memory output 132 to the cache memory output 122, once received. The comparison circuit 140 asserts a miscompare signal 142 when the associative memory output 132 is not equal to the cache memory output 122. A temporary associative memory output buffer 134 buffers the associative memory output 132 until the corresponding coherent cache memory output 122 is received by the comparison circuit 140. The assertion of the miscompare signal 142 will trigger a pipeline stall. Also, the coherent cache memory output 122 is written to the associative memory 130 when the miscompare signal 142 is asserted.

A practical and useful L0-like data cache can be valuable and practical if it can be uniquely tailored to only those dependent load use situations where it is valuable, if it can be made to ignore coherency rules in general, if its hit rate for its intended workload can approach 80%, if the penalty for a miss can be kept to no more than the extra cycles required to access the L1 DCache, and if it can achieve a one or two cycle reload but without adding extra L1 Dcache read cycles that stall the pipeline. The associative memory 130 should be a small enough-sized array (e.g., 2–4 KB) so that any word can be accessed by only two levels of selectors: a row address select or RAS, and a column address select or CAS. If a zero delay address generating scheme is employed in the cache address latch itself of the associative memory 130 and a minimal address repowering is implemented, a 2 KB associative memory 130 can make the same timing/cycle time as the ALU/AGEN units if it is treated like a peer of an ALU/AGEN from core floor plan and pipeline perspectives.

Figure 2:
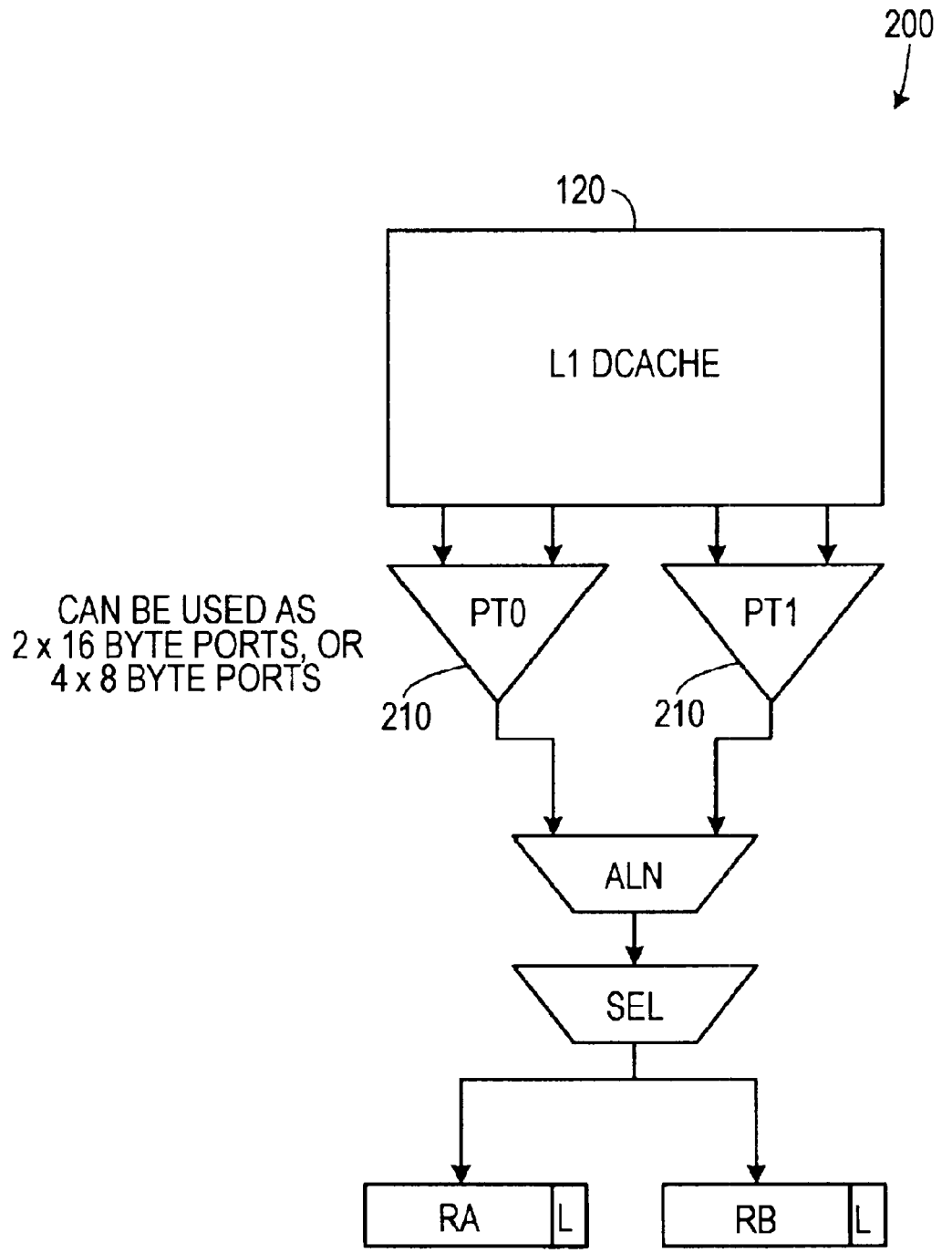
FIG. 2 is a block diagram of a base L1 Dcache load port structure, that may be used with one embodiment of the invention.

The associative memory 130 load buffer usage algorithm may be summarized as follows:

4 KB Load Fetch Buffer
   Only fetch lines because of a dependent use of a load
   Fetch only buffer of most recent 64 lines
   64-byte line with four 16-byte sublines
   Load buffer is non-coherent
Load Buffer Fetches in Parallel with L1 Port 0
   Acts as a stall reducer for loads with dependency
   Provides early result to RA/RB bypass register
   Only the L1 load fetch writes the register file (a speculative LBUF target never writes the register file)
   Stores to load buffer sublines are ignored
Only Basic Load Types Can Access Load Buffer
   No sign extending, byte reversing, DW crossing loads
   No LQ, Float loads
   HW alignment required
   Loads violating these restrictions cause a load buffer miss Since it is desired that the associative memory 130 not interfere with other ongoing cache memory 120 load accesses, it is desirable to keep the associative memory 130 line size small. Referring to FIG. 2, one embodiment employs a base cache 200 of a double-wide two port (equivalent to a single width pseudo four port) L1 Dcache 120 scheme, using one port per functional unit (assuming that there are four functional units involved). Many instruction set architectures require a quadword load function of 16 bytes so each port is 16 bytes wide. The four read ports 210 (two of which are shown for simplicity) are heavily utilized for burst and streaming load cases such as load multiple, moving strings, numeric intensive loops, etc., where the associative memory 130 LBUF cache is of no value and is not enabled. However, for dependent loads and load use cases where an associative memory 130 LBUF is valuable to reduce stalls, less than one port per cycle is used on average for loads. Thus, when a scalar load with dependent use executes, it almost always has the remaining three ports idle. In this case, the single load is allowed to access all four read ports in parallel, each port accessing a different sequential 16-byte subline for a total access of a 64-byte line. Thus, a line size of 64 bytes can be achieved in a single cycle access/reload that causes no access bus or array interference in subsequent cycles. If by chance two or three loads were executed in parallel, then only one or two free read ports exist. In these cases then, only the remaining one or two free 16-byte ports can also fetch sublines to the associative memory 130 LBUF (i.e., 328 or 488 in total). To handle this, each 16B subline of the 64B line has a separate valid bit to indicate if it exists in the associative memory 130 LBUF or not. Even though a 648 line size is available, the hit rate of a direct map 2 KB–4 KB associative memory 130 LBUF is still poor, perhaps 50–60%. With a roughly two-cycle penalty for a miss, little gain is achieved.

Referring again to FIG. 1, the associative memory 130 LBUF is not used as a general case cache but only as a special case cache to eliminate stalls when a generic D-form (Effective Address=base+displacement) load issues with a dependent use. For example, if 60% of dependent use loads have a highly predictable target value (as found by the hardware monitoring execution with counters), use a value prediction scheme to provide an early value of the load target to eliminate any stall. Then, for only the remaining 40% of dependent use loads, use the associative memory 130 LBUF to cache them to eliminate stalls. This again increases the effective size of the associative memory 130 LBUF to approximately 40 KB (1/40%×16 KB) which can give a hit rate approaching 90%.

Figure 3:
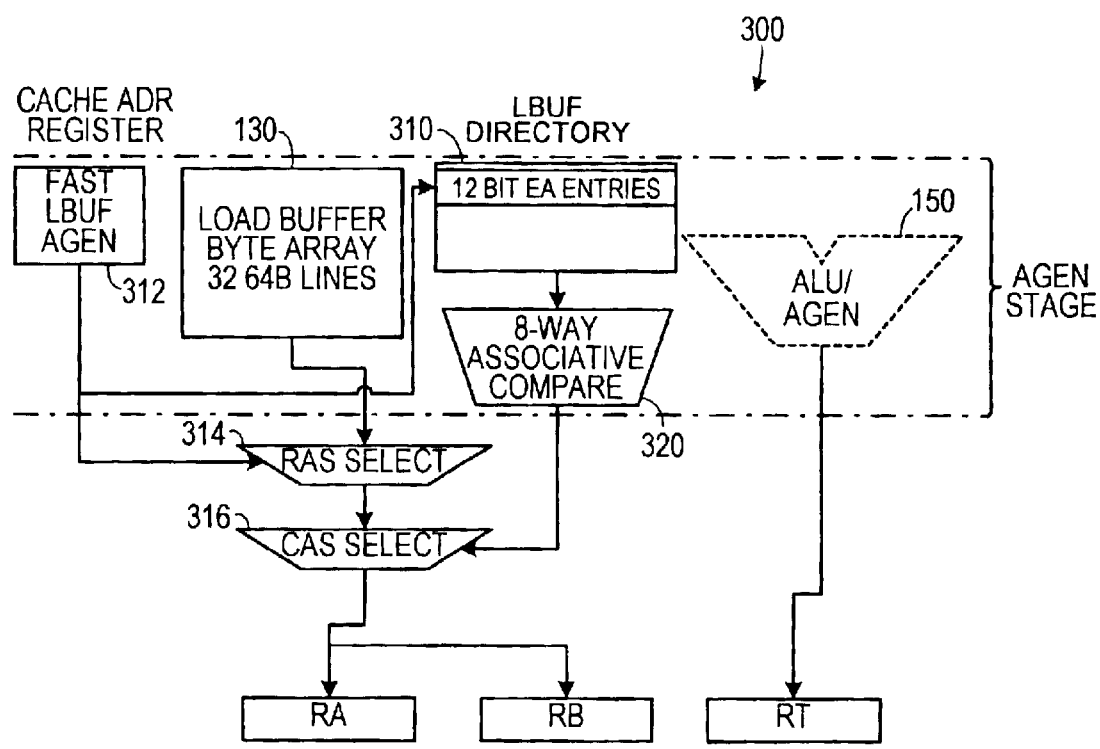
FIG. 3 is a block diagram of an associative memory that may be used with one embodiment of the invention.

As shown in FIG. 3, an associative memory 300 that may be used with the embodiment shown includes a cache address register 312 that addresses a row address selector 314 and a column address selector 316. A 12-bit wide associative memory directory 310 is also addressed by the cache address register 312 and outputs its value to an 8-way associative comparator 320, which also outputs to the column address selector 316.

There are several features of the associative memory 130 LBUF that greatly simplify the implementation and also significantly speed up the access path allowing a faster cycle time and/or a larger associative memory 130 LBUF size. The fact that the associative memory 130 LBUF need not be kept coherent means that the associative memory 130 LBUF need not be snooped by the bus logic, that any difficult cycle window cases from reloads, updates, etc. are ignored, and that an LBUF cache directory is not required at all if the associative memory 130 LBUF is implemented as a direct map (1 way associative) cache. The reason the associative memory 130 LBUF is called a buffer then, as opposed to a cache, is because of this noncoherent nature.

This noncoherent simplification is made possible by a requirement that every load that accesses the associative memory 130 LBUF must also always start the 11 Data cache memory 120 load access. This is required anyway to allow for an immediate reload of the associative memory 130 LBUF line on an associative memory 130 LBUF miss (and also so as not to cause later cache memory 120 accesses to reload the associative memory 130 LBUF). Thus, on a cache memory 120 hit access, the correct and coherent data will always be ready in n minus one cycles later (where n is the L1 Dcache access in cycles) than the speculative noncoherent but fast associative memory 130 LBUF access. Therefore, the speculative associative memory 130 LBUF access data can be used immediately by a functional unit as bypassed/forwarded data, and it can be buffered one or more cycles in a temporary register where it can be compared to the nonspeculative data accessed from the cache memory 120.

If the two values agree, then it is certain that the speculative associative memory 130 LBUF output 132 value used early was correct. If the values disagree (i.e., the miscompare signal 142 was asserted), then it is known that the speculative associative memory 130 LBUF output 132 data was incorrect, and this is treated as an associative memory 130 LBUF miss requiring a reload from the already fetched cache memory 120 output 122.

This system has the further advantage of not requiring additional write ports on the GPR register file 126 since correct associative memory 130 LBUF accessed data are never written to the register file 126. They are only used in the fast bypass/forward paths to the ALU 150, etc, and only the always correct cache memory 120 data are written to the register file 126. The noncoherent nature of the associative memory 130 LBUF also allows it to ignore stores which might write one of its lines. This is another simplification with almost no performance loss, since for dependent load use cases especially and in an optimized code environment generally, reaccess of the stored associative memory 130 LBUF data is very unlikely.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A memory system for a computational circuit having a pipeline including at least one functional unit, comprising:

a. an address generator that generates a memory address;
   b. a coherent cache memory that is addressed by the memory address, a cache directory being associated with the cache memory, the cache memory capable of generating a cache memory output;
   c. a non-coherent directory-less associative memory that is addressed by the memory address and that receives input data from the cache memory, the associative memory capable of generating an associative memory output that is delivered to the functional unit; and
   d. a comparison circuit that compares the associative memory output to the cache memory output and that asserts a miscompare signal when the associative memory output is not equal to the cache memory output.

2. The memory system of claim 1, further comprising a temporary associative memory output buffer that holds the temporary associative memory output until the cache memory output becomes available.

3. The memory system of claim 1, further comprising a circuit that writes the cache memory output to the associative memory when the miscompare signal is asserted.

4. A method of providing data to a functional unit of a pipeline, comprising the steps of:

a. addressing a coherent cache memory with a memory address, thereby generating a cache memory output;
   b. addressing a non-coherent directory-less associative memory with the memory address, thereby generating an associative memory output;
   c. delivering the associative memory output to the functional unit;
   d. comparing the cache memory output to the associative memory output; and
   e. when the cache memory output is not identical to the associative memory output, disabling the functional unit.

5. The method of claim 4, further comprising the step of buffering the associative memory output until the cache memory output becomes available.

6. The method of claim 4, further comprising the step of writing the cache memory output to the associative memory when the cache memory output is not identical to the associative memory.

* * * * *